United States Patent

Murakoshi et al.

Patent Number: 5,090,110
Date of Patent: Feb. 25, 1992

[54] METHOD FOR MANUFACTURING STATOR FOR ROTATING MACHINE

[75] Inventors: Toshiichi Murakoshi, Neyagawa; Hiroshi Kawazoe, Hirakata; Toshihiro Takahata, Mino; Shigeo Inaki; Tatsuo Yamashita, both of Takefu; Yoshinori Doi, Sabae, all of Japan

[73] Assignee: Matsushita Electric Industrial Co., Ltd., Osaka, Japan

[21] Appl. No.: 596,389

[22] Filed: Oct. 15, 1990

[30] Foreign Application Priority Data

Oct. 13, 1989 [JP] Japan .................. 1-266472

[51] Int. Cl.⁵ .................. H02K 15/08
[52] U.S. Cl. .................. 29/596; 29/734; 29/736
[58] Field of Search .......... 29/596, 598, 732, 734, 29/736; 242/1.1 R, 1.1 A, 1.1 E, 5, 7.05 R, 7.05 A, 7.05 B, 7.05 C

[56] References Cited

U.S. PATENT DOCUMENTS

| | | |
|---|---|---|
| 1,661,332 | 3/1928 | Gomory . |
| 2,711,008 | 6/1955 | Smith .................. 29/596 |
| 3,792,299 | 2/1974 | Dammar .................. 310/258 |
| 3,927,456 | 12/1975 | Dammar . |
| 4,679,312 | 7/1987 | Nussbaumer et al. .......... 29/596 |

FOREIGN PATENT DOCUMENTS

| | | | |
|---|---|---|---|
| 210669 | 2/1987 | European Pat. Off. ........ 29/596 |
| 58-33945 | 2/1983 | Japan . | |
| 224651 | 9/1988 | Japan .................. 29/596 |

Primary Examiner—P. W. Echols
Attorney, Agent, or Firm—Wenderoth, Lind & Ponack

[57] ABSTRACT

A method for manufacturing a stator for use in a rotating machine provided with a core main body having a plurality of teeth projecting from an outer circumferential side of the core main body and wound with a coil, and a ring member fitted on the outer circumferential portion thereof. The method includes the steps of: inserting a jig into an interior of the core main body; clamping a wind start portion of the coil on one portion of the jig, winding the coil between the teeth, and clamping wind terminating portion of the coil on the other portion of the jig; fitting the ring member over the outer circumferential portion of the core main body; mounting a terminal unit on the stator; winding the end of the coil, clamped on the jig, around respective pins of the terminal unit and soldering the ends of the coil onto the pins; and shaping configuration of the coil wound between the teeth.

5 Claims, 10 Drawing Sheets

METHOD FOR MANUFACTURING STATOR FOR ROTATING MACHINE

BACKGROUND OF THE INVENTION

The present invention relates to a method for manufacturing a stator for use in a rotating machine such as an inner rotor type electric motor having a cylindrical stator.

A conventional stator for use in an inner rotor type electric motor is manufactured by a so-called inserting method. According to this method, a coil wound around a frame is inserted into a slot between adjacent teeth of a plurality of teeth projecting from the inner circumferential side of a cylindrical stator core.

The present applicant has proposed a stator core, comprising a core main body having a plurality of teeth projecting from the outer circumferential side thereof and a ring member fitted on the outer circumferential portion of the teeth, disclosed in Japanese Laid-Open Patent Publication No. 58-33945. According to this stator core, a coil is directly wound by a flyer on the teeth positioned on the outer circumferential side of the core main body.

According to the conventional inserting method, a coil is shaped after it is wound, the coil is inserted into a slot through a slit positioned between edge portions of adjacent teeth, portions of the coil projecting from both edges of the stator core are shaped to fix them to a predetermined member, and then the wind start and terminating portions of the coil, i.e. the outgoing lines, are fixed to fixing members. As such, the method requires a lot of steps and its manufacturing process is complicated, so that its productivity is low and it is very difficult to automate the manufacturing process.

According to the method disclosed in Japanese Laid-Open Patent Publication No. 58-33945, since the coil is directly wound around the core main body, it is unnecessary to insertion the coil and perform subsequent operations after the insert of the coil. The manufacturing process can be simplified to a great extent; however, the method still requires time and labor to fix the outgoing lines of the coil to fixing members. However it is difficult to automate the manufacturing process.

It is difficult to know the number of turns (hereinafter referred to as the space factor) of the coil which can be wound in a slot formed between teeth and in addition, the space between the outer circumferential portion of the coil and the projection positioned on the edge of the tooth is small, so that it is difficult to insert a wedge therebetween.

SUMMARY OF THE INVENTION

Accordingly, an essential object of the present invention is to provide a method, for manufacturing a stator for use in a rotating machine, capable of effectively mounting a coil on a stator core and automating the manufacturing process required therefor and a method, for manufacturing the rotating machine, comprising a process for incorporating the rotor into the stator.

In accomplishing these and other objects, according to a first aspect of the present invention, there is provided a method for manufacturing a stator for use in a rotating machine provided with a core main body having a plurality of teeth projecting from an outer circumferential side of the core main body and wound with a coil and a ring member fitted on the outer circumferential portion thereof, comprising the steps of: inserting a jig into an interior of the core main body; clamping a wind start portion of the coil on one portion of the jig, winding the coil between the teeth, and clamping a wind terminating portion of the coil on the other portion of the jig; fitting the ring member on the outer circumferential portion of the core main body; inserting a terminal unit into the core main body; winding the end of the coil, clamped on the jig, around respective pins of the terminal unit and soldering the respective ends of the coil onto the ends of the respective pins; and shaping the configuration of the coil wound between the teeth.

According to the first aspect of the present invention, a jig is inserted into the interior of the core main body and the wind start and terminating portions of the coil are clamped by the jig. Therefore, the wind start and terminating portions of the coil can be easily transferred from the jig to a corresponding pin of the terminal unit, for supplying electric current, installed in a subsequent process. As such, the method, for manufacturing the rotating machine, ranging from the process for manufacturing the stator to the process for incorporating the rotor into the stator can be easily automated.

According to a second aspect of the present invention, there is provided a method for manufacturing a stator for use in a rotating machine, further comprising the step of engaging the interior of the core main body by a mechanism of the jig between the steps of inserting and clamping.

According to the second aspect of the present invention, since the interior, i.e. inside diameter of the core main body is regulated by the mechanism, the core main body which is comparatively deformable is reinforced and maintained although the core main body is thin.

According to a third aspect of the present invention, there is provided a method for manufacturing a stator for use in a rotating machine, wherein in the winding step, when the coil is wound between the teeth by a flyer, the coil is pressed toward a center of the core main body in synchronization with rotation of the flyer.

According to the third aspect of the present invention, the coil is pressed toward the bottom of the slot between the teeth (toward the center of the core main body) cooperatively with the rotation of the flyer. Therefore, the slot can accommodate many turns of the coil and as such the space factor can be improved.

According to a fourth aspect of the present invention, there is provided a method for manufacturing a stator for use in a rotating machine, further comprising the step of inserting a wedge, comprising an insulating material, between an outer circumferential portion of the coil wound between the teeth and a projection positioned in an edge of the tooth so as to fill a slot between the teeth, and pressing the coil toward a center of the core main body so as to shape the coil and a slit is formed between a wedge inserting portion between the outer circumferential portion of the coil and the projection.

According to the fourth aspect of the present invention, after the coil is wound on the core main body, the outer circumferential portion of the coil is pressed toward the center of the core main body and is shaped. Therefore, the wedge can be easily inserted into the space between the projection positioned on the tooth edge and the outer circumferential portion of the coil.

According to a fifth aspect of the present invention, there is provided a method for manufacturing a stator for use in a rotating machine, wherein the unit is mounted on one of the core main body and the ring member in the step of inserting the terminal unit, and the wind start portion and the wind terminating portion of the coil are removed from the jig and are cut to a predetermined length respectively before winding in the step of winding the ends of the coil around the respective pins thereof.

According to the fifth aspect of the present invention, the wind start and terminating portions of the coil retained by the jig are wound around the pin of the terminal unit mounted on the core main body or the ring member. Therefore, a coil connecting operation can be easily automated.

BRIEF DESCRIPTION OF THE DRAWINGS

These and other objects and features of the present invention will become clear from the following description of the preferred embodiments thereof with reference to the accompanying drawings, in which.

DETAILED DESCRIPTION OF THE EMBODIMENTS

Figure 1:
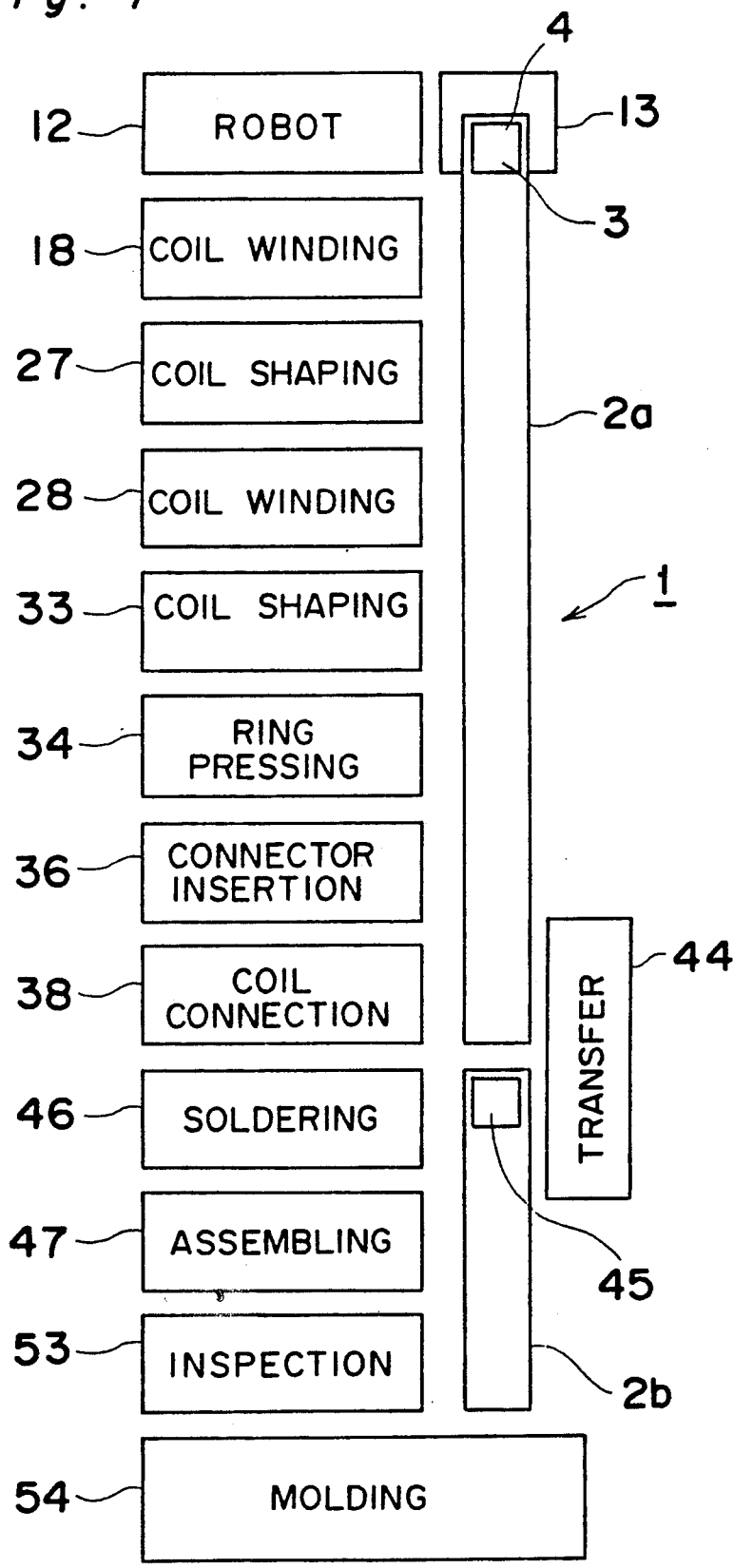
FIG. 1 is a flow diagram showing the entire arrangement of a manufacturing line for carrying out a process for manufacturing a rotating machine according to the present invention.

Before the description of the present invention proceeds, it is to be noted that like parts are designated by like reference numerals throughout the accompanying drawings.

FIG. 1 is a flow diagram showing the steps of a process carried out by an automated line for producing a rotating machine according to the embodiment of the present invention.

In FIG. 1, reference numeral 1 denotes an automated line for producing of a rotating machine, comprising a pair of conveyors 2a and 2b, a front and a rear conveyor, which move thereon a plate 4 for holding a plurality of jigs 3 (refer to FIG. 2) and positioning the plate 4 at an arbitrary position thereof. Machines described below are sequentially arranged along the conveyor lines 2a and 2b. Reference numeral 12 designates a robot for sequentially placing a supplied core main body 8 on each jig 3 arranged along the conveyor line 2a. A mechanism 13 for opening and closing a collet 9 of the jig 3 is provided along the conveyor line 2a.

Figure 2:
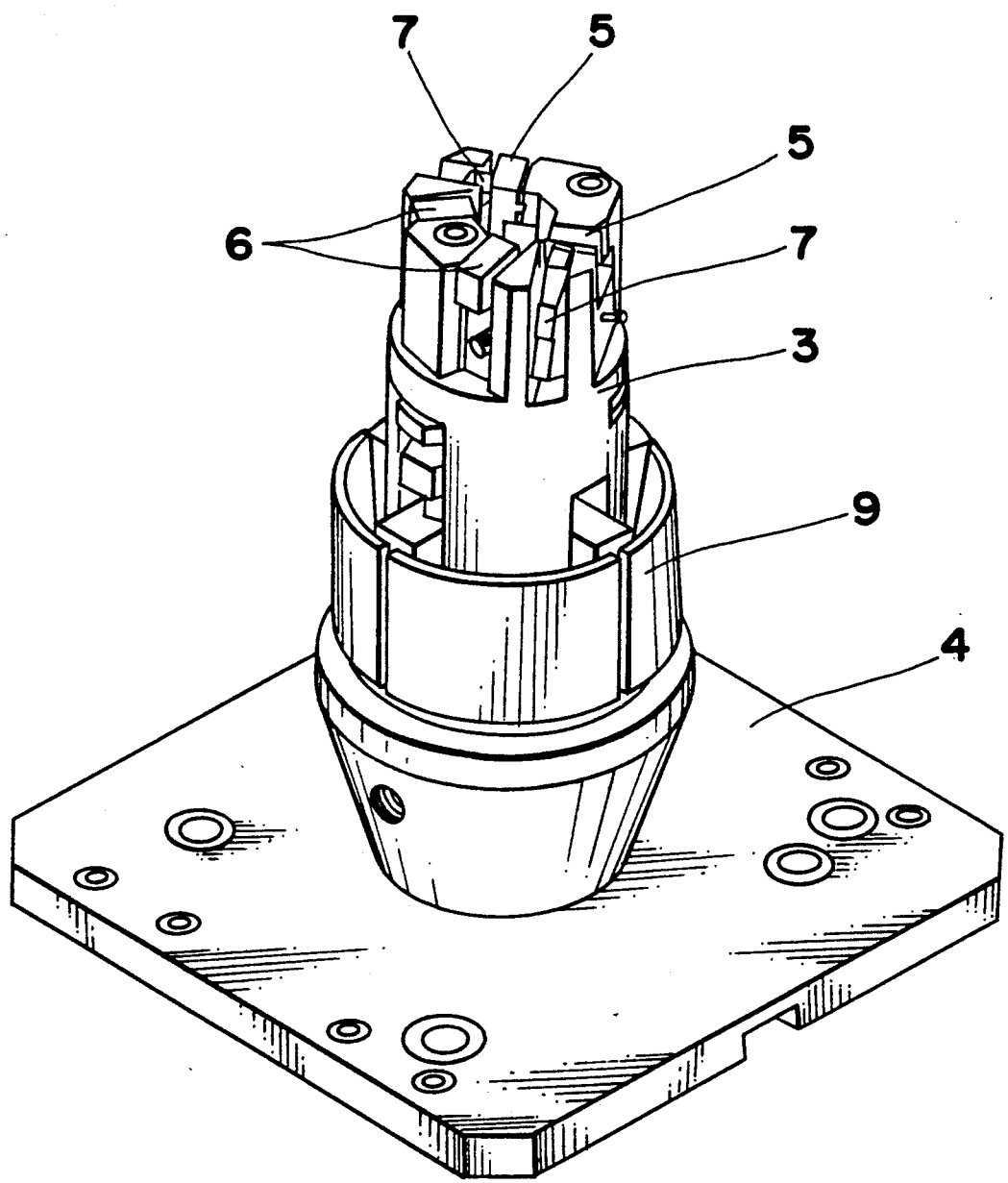
FIGS. 2 and 3 are perspective and sectional views, respectively, showing a jig used in the process.
Figure 3:
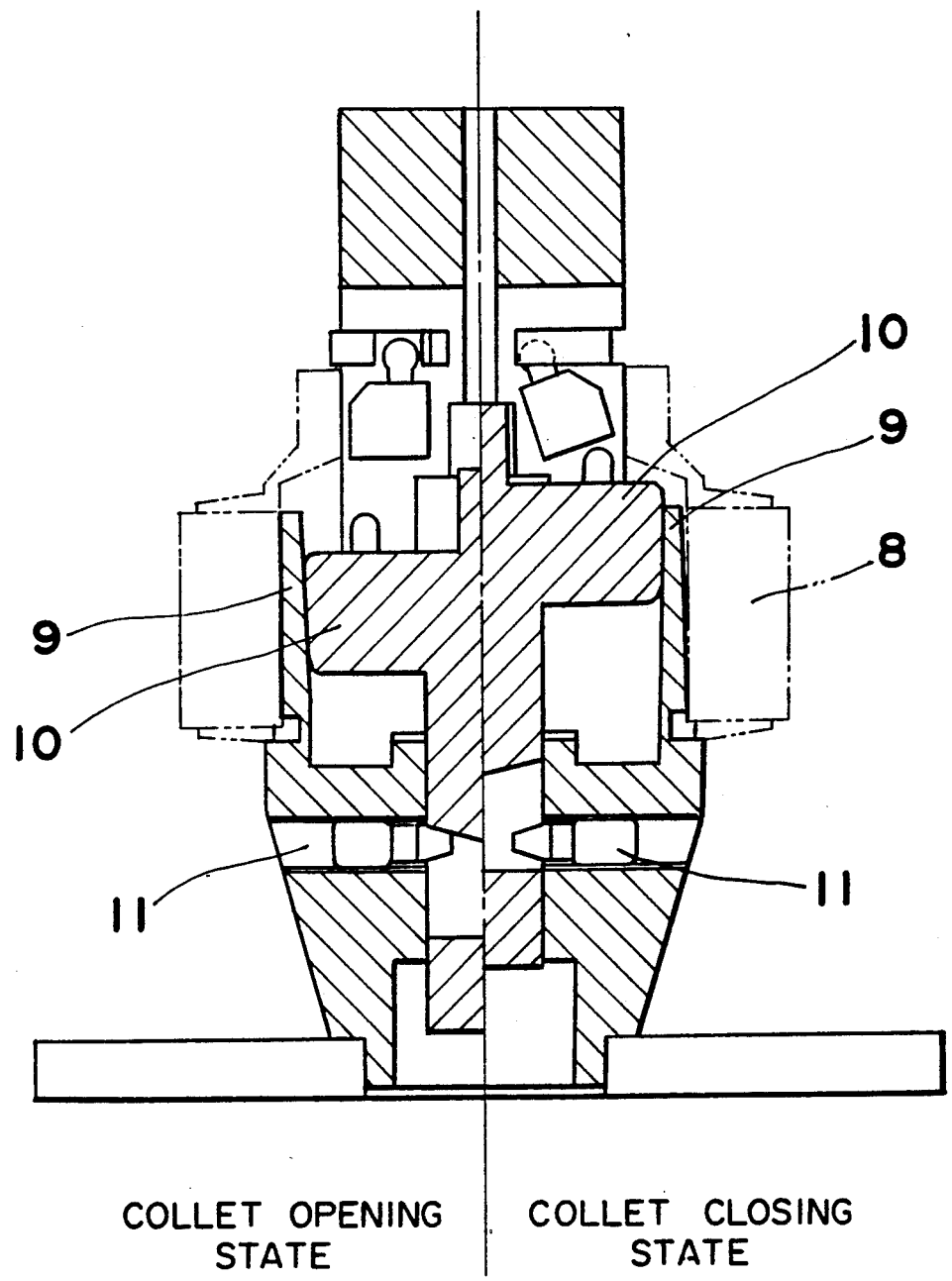

In FIGS. 2 and 3, a plurality of coil clamps 5 and 6 (two each in this embodiment) are mounted above the jig 3. The clamp 5 is provided with an eccentric cam 7 for locking a coil. The collet 9 for engaging and holding the interior of the core main body 8 is positioned in the middle portion thereof. The collet 9 is opened and closed by moving a taper pin 10 upward and downward. A stopper 11 is provided to adjust the diameter of the collet 9.

Figure 4:
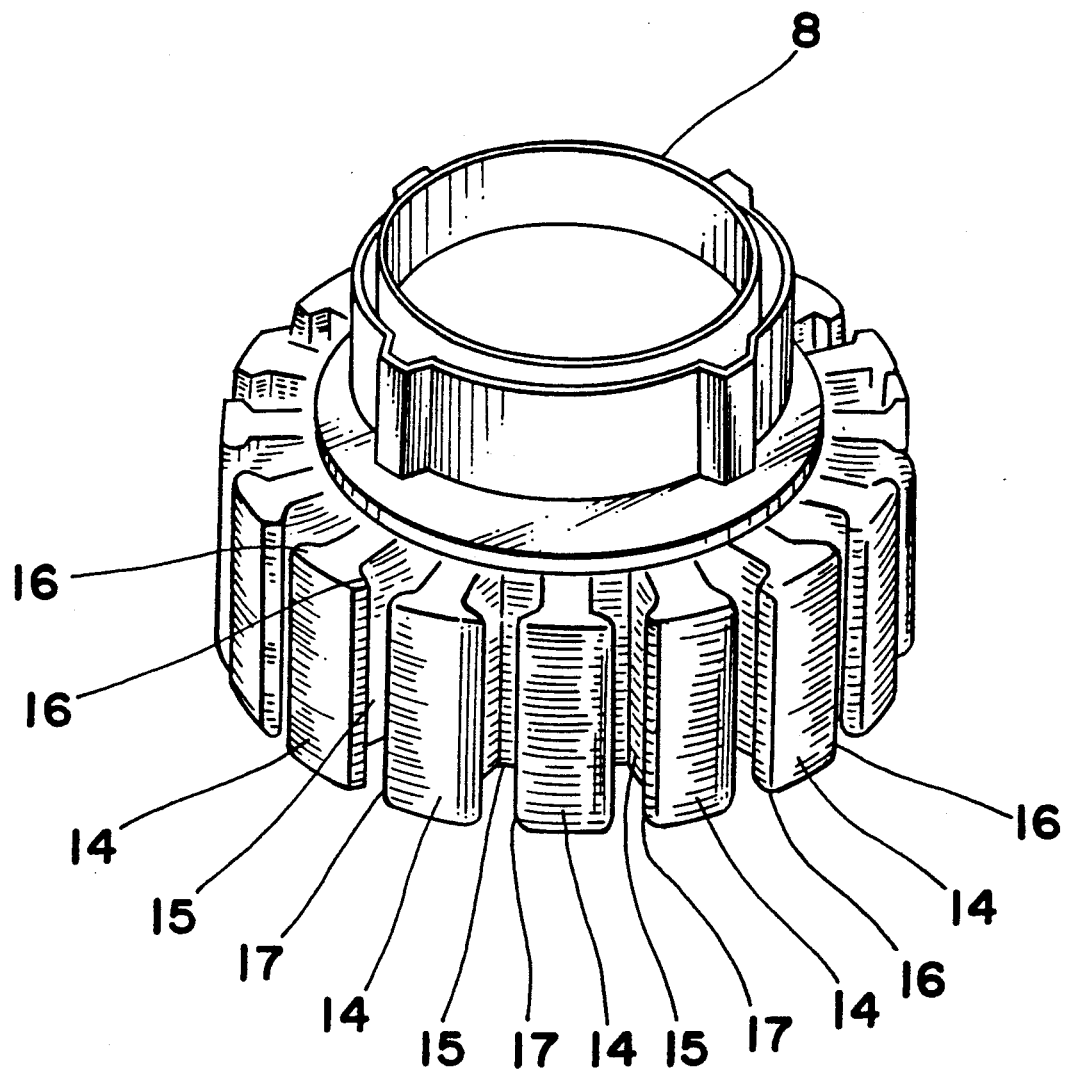
FIG. 4 is a perspective view showing a core main body.

As shown in FIG. 4, a plurality of teeth 14 project from the outer circumferential portion of the core main body 8 and a slot 15 is defined between each two adjacent teeth 14. Projections 16 are formed on both sides of each tooth 14 projecting in the circumferential direction thereof. A slit 17 for allowing the coil to pass therethrough during the coil winding is formed between projections 16 opposed to each other.

Figure 5:
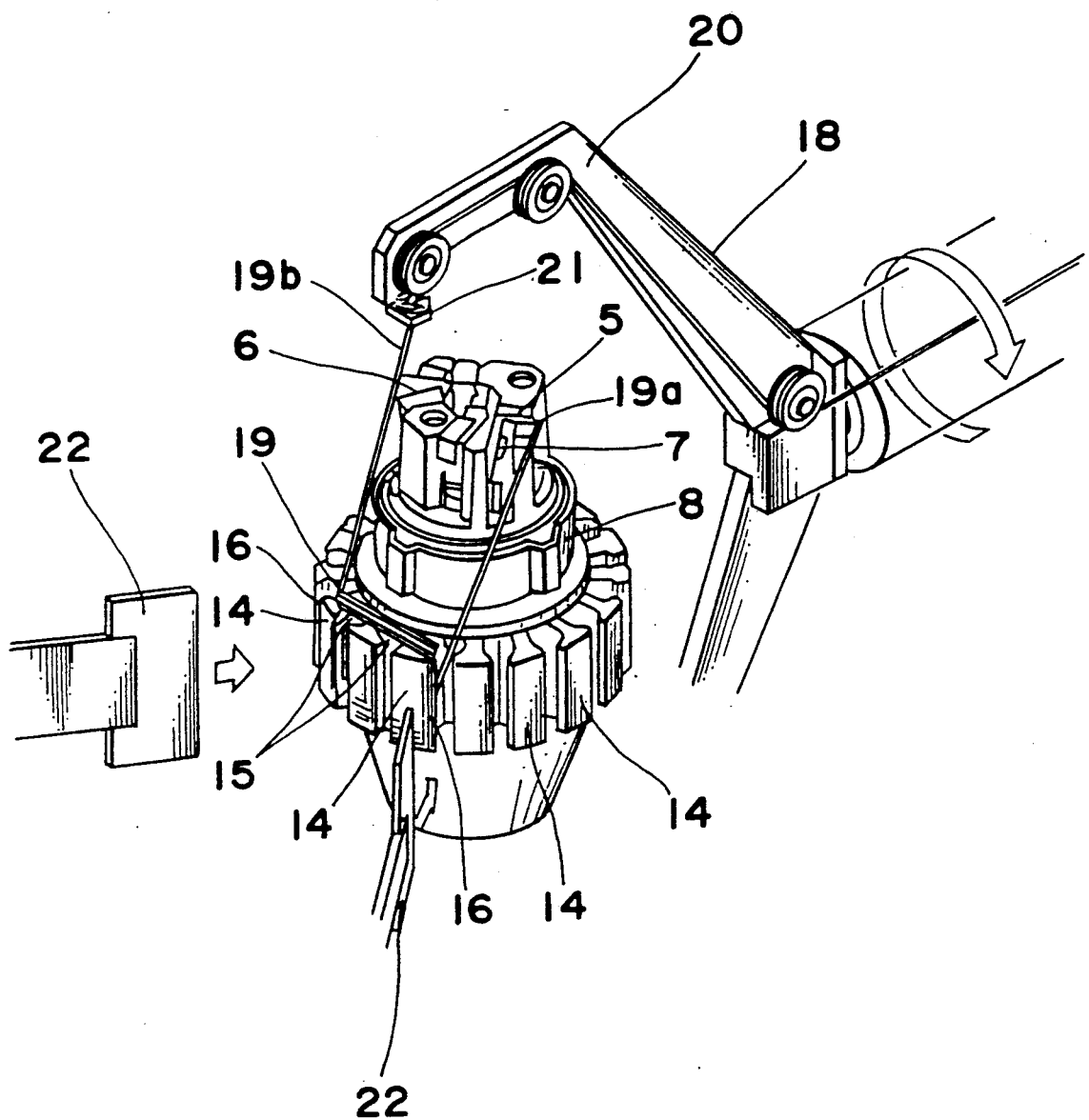
FIG. 5 is a perspective view showing an inner circumferential side winding portion.

FIG. 5 is a perspective view showing the winding portion of a pair of first winding machines 18.

Figure 6:
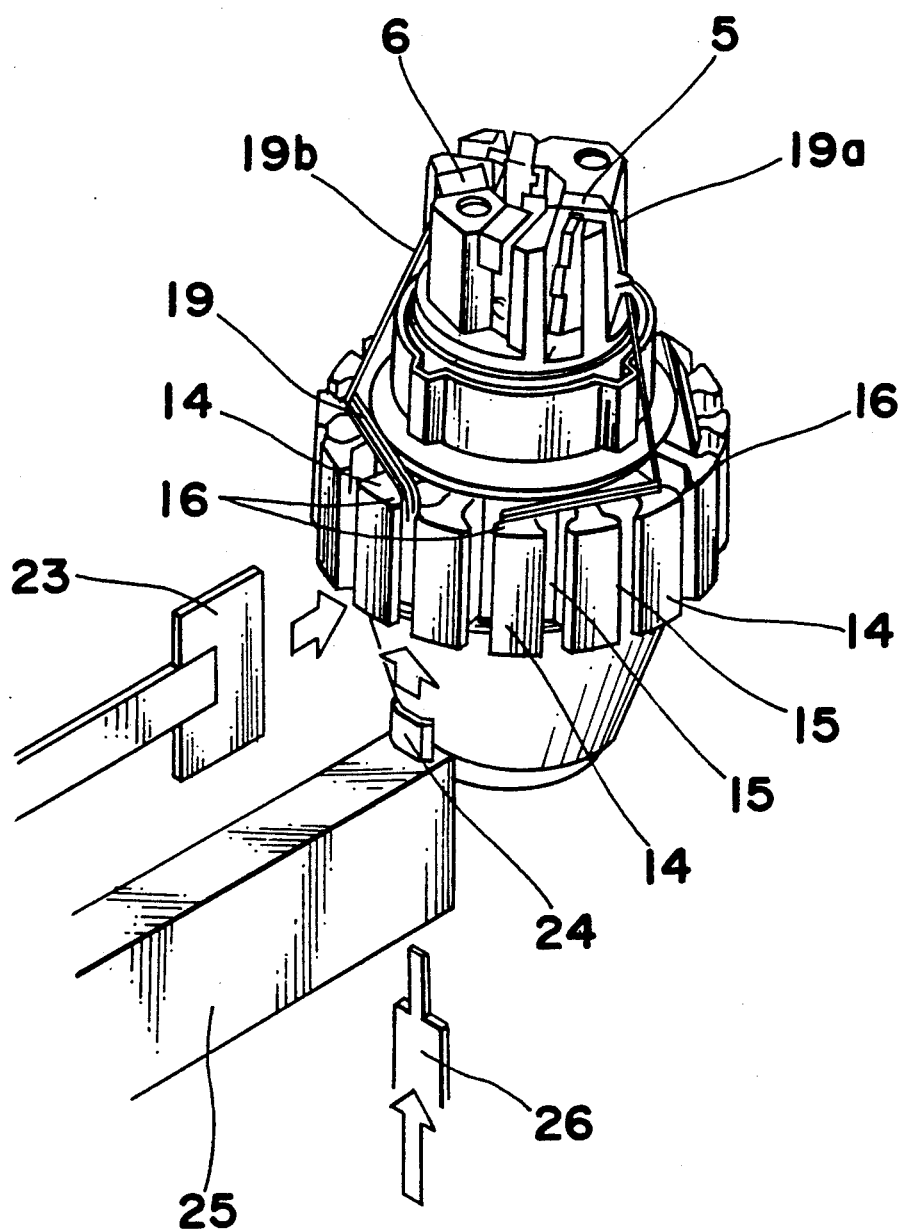
FIG. 6 is a perspective view showing a wedge inserting portion.

In FIG. 5, an inner circumferential coil 19 is wound between the teeth 14 of the core main body 8 using a flyer 20. At this time, a wind starting portion 19a of the coil 19 is held by the first clamp 5 locked by the first eccentric cam 7. Thereafter, groups of three teeth 14 are wound using corresponding end slots 15 with a predetermined number of turns of the coil 19 with two slots 15 left between the ends slots. When the coil 19 is wound round the core main body 8 in this manner, the wind terminating portion 19b of the coil 19 is held by the second clamp 6 as shown in FIG. 6. The coil 19 is supplied from a nozzle 21 positioned at the top portion of the flyer 20. The nozzle 21 is positioned above the core main body 8 corresponding to the center thereof, thus tightening the coil 19 toward the bottom of the slots 15. Cooperatively with the flyer 20, a pusher 22 presses the coil 19 toward the bottom of the slots 15 at each turn of the coil 19.

FIG. 6 is a perspective view showing the wedge inserting portion of the winding machine 18.

In FIG. 6, a shaping plate 23 shapes the coil 19 wound on the core main body 8 and provides a gap in the radial direction thereof between the outer circumferential surface of the coil 19 and the inner circumferential surface of the projection 16 positioned on the tooth edge so as to facilitate the insertion of a wedge 24. therebetween. The wedge 24 is provided from a magazine 25 after it is shaped by cutting it to a predetermined length. Wedges 24 are inserted one by one between the coil 19 and the projections 16 by being pressed upward by a bar 26 so as to occupy the slots between the teeth.

A coil shaping machine 27 shapes the configuration of the coil 19 wound on the core main body 8 by the winding machine 18.

Figure 7:
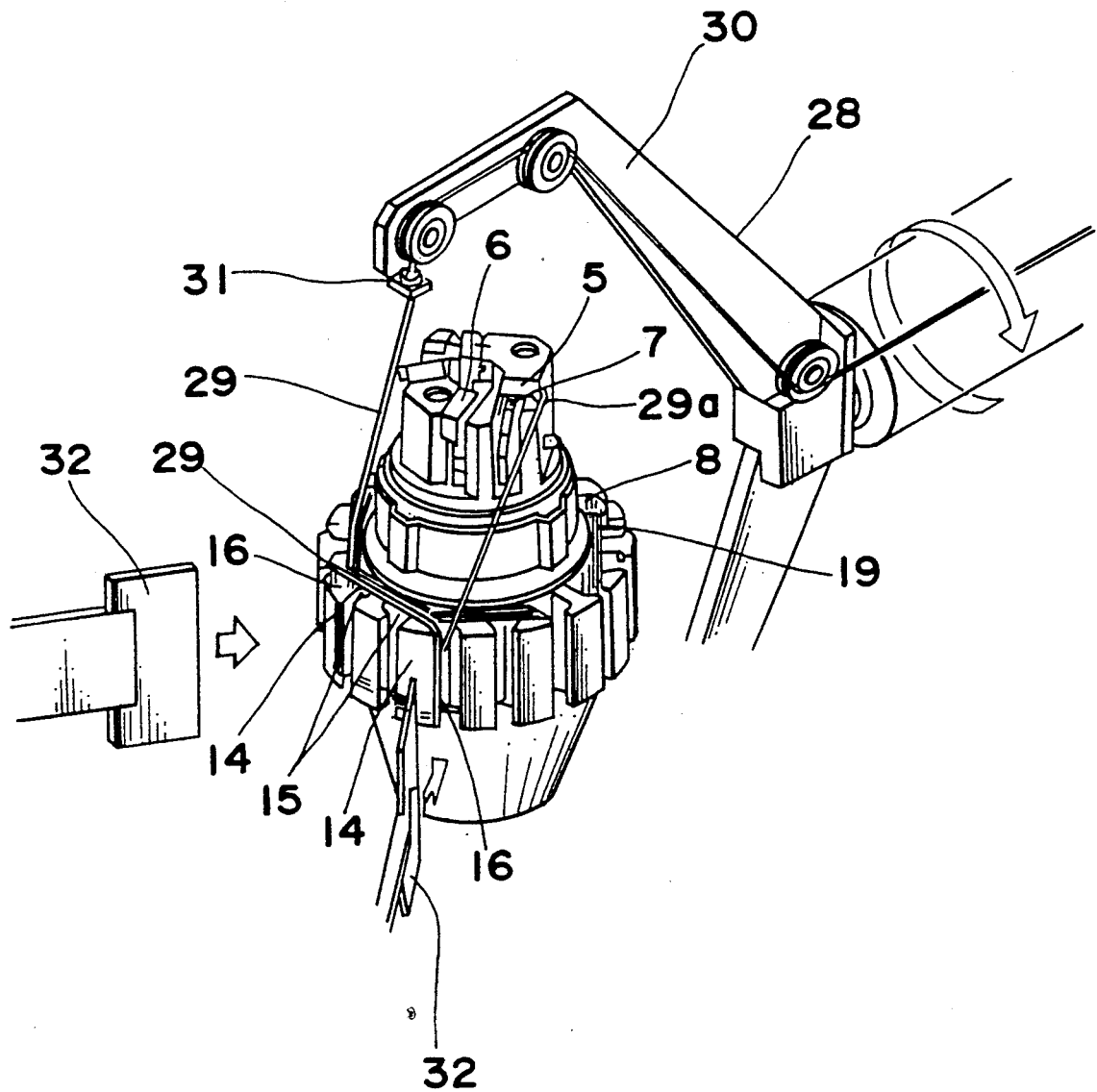
FIG. 7 is a perspective view showing an outer circumferential side winding portion.

Reference numeral 28 denotes a pair of second winding machines which wind an outer circumferential coil 29 between the teeth 14 of the core main body 8 as shown in FIG. 7. The wind start portion of the coil 29 is held by the first clamp 5 and locked by the second eccentric cam 7. Thereafter, similarly to the inner circumferential coil 19, groups of three teeth 14 are wound using corresponding end slots 15 with a predetermined number of turns of the coil 29 with two slots 15 left between the end slots (the inner circumferential already coil 19 has already been wound in these two slots).

The inner circumferential coil 19 and the outer circumferential coil 29 are wound in zigzag in the circumferential direction of the core main body 8, and finally, the terminating portion of the coil 29 is held by the second clamp 6.

A flyer 30, a nozzle 31, and a pusher 32 shown in FIG. 7 are arranged and function similarly to the flyer 20 and the nozzle 21 of the first winding machine 18 and the pusher 22 each shown in FIG. 5. The winding machine 28 also includes a wedge inserting portion as shown in FIG. 6 which performs the same operation as shown in FIG. 6.

In a coil shaping machine 33, the wedges 24 and the coils 19 and 29 are engaged by a pusher similar to pushers 22 and 32 which is inserted through the slit 17 and pressed inward. Thus, the coils 19 and 29 are shaped.

A ring member pressing machine 34 presses a ring member 35 over the outer circumferential portion of the core main body 8 so as to fit the ring member 35 thereon.

A connector insertion machine 36 mounts an electric current supply connector 37 on either the core main body or the ring member 35, the mounting on the ring member being shown in the drawings, and straightens the cylindrical configuration of the coils 19 and 29 in the vertical direction thereof.

A coil connection machine 38 removes the wind start portion 19a of the coils 19 and the wind start portion 29a of the coils 29 from the clamp 5 of the jig 3 and the terminating portion 19b of the coils 19 and the terminating portion 29b of the coils 29 from the clamp 6 thereof, and winds them around corresponding terminal pins 39 of the connector 37.

Figure 8:
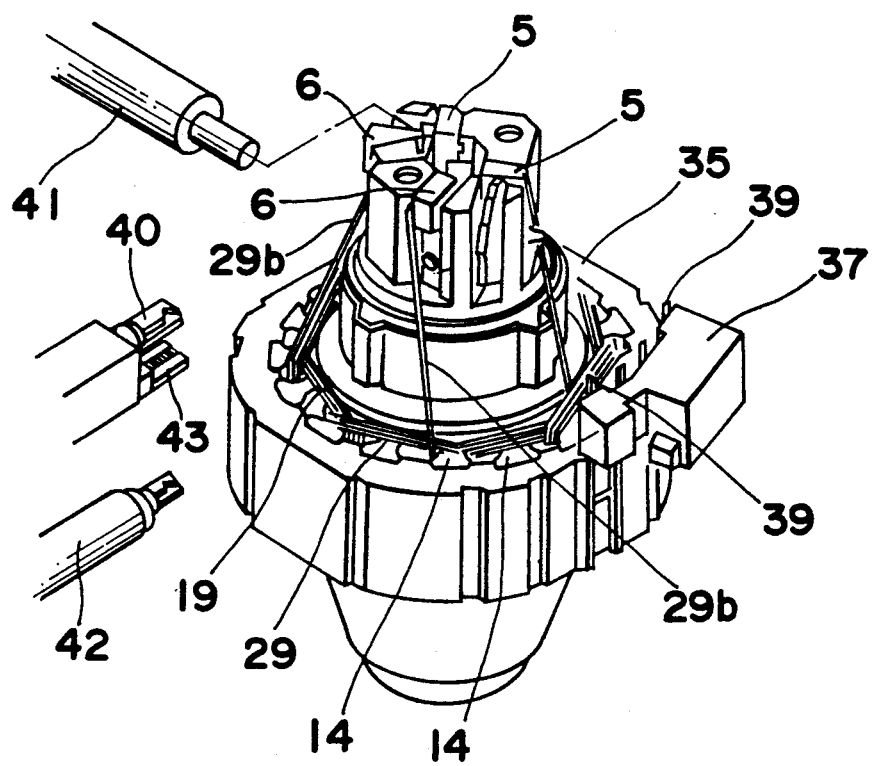
FIGS. 8 through 10 are perspective views showing a connecting process.
Figure 9:
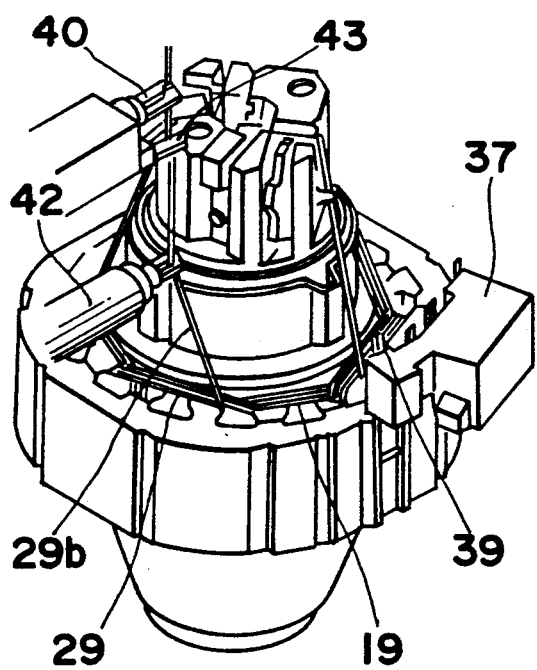
Figure 10:
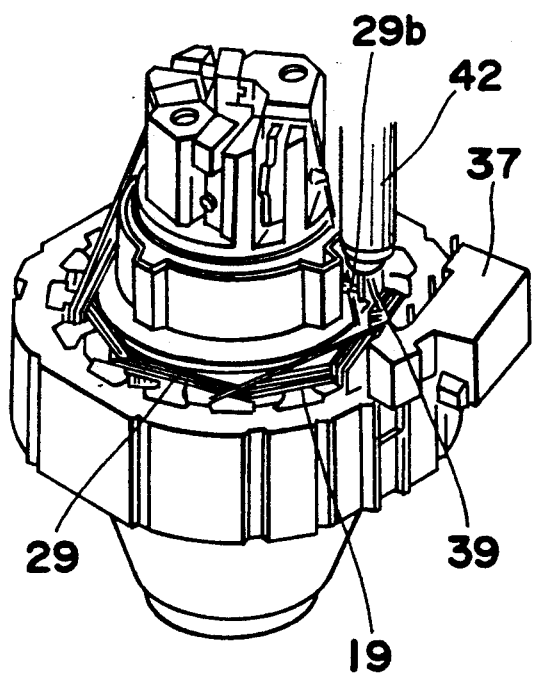

FIGS. 8, 9, and 10 show the connecting portion of the connecting machine 38.

In FIGS. 8, 9, and 10, a chuck 40 moves in the radial direction of the core main body 8 and removes the terminating portion 29b of the coil 29 from the second clamp 6, thus catching it.

The chuck 40 moves vertically to tighten the terminating portion 29b of the coil 29 to remove slack and transfer it to a binding jig 42. A cutter 43 provided below the chuck 40 cuts the coil 29 to a predetermined length. The chuck 40 moves to discharge the cut off portion of the coil 29. The binding jig 42 pivots so that it becomes parallel with the terminal pins 39 of the connector 37, and moves above the first terminal pin 39. The binding jig 42 pivots about the first terminal pin 39 so as to wind the terminating portion 29b around the first terminal pin 39. The binding jig 42 repeats similar operations to wind the wind start portion 29a of the coil 29, the wind start portion 19a of the inner circumferential side coil 19, and the terminating portion 19b thereof around the corresponding remaining terminal pins 39, respectively. When the chuck 40 moves to catch the wind start portions 19a of the coil 19 and the wind start portions 29a of the coil 29, a cylinder 41 presses the first eccentric cam 7 so that the first clamp 5 is unlocked.

A transfer apparatus 44 transfers the core main body 8 from the jig 3 to a pallet 45 placed on the conveyor line 2b. The transfer apparatus 44 includes a mechanism for opening and closing the collet 9 of the jig 3.

A soldering machine 46 solders the wind start portion 19a of the coil 19, the wind terminating portion 19b thereof, the wind start portion 29a of the coil 29, and the wind terminating portion 29b thereof onto each corresponding terminal pin 39 around which these portions have been wound.

Figure 11:
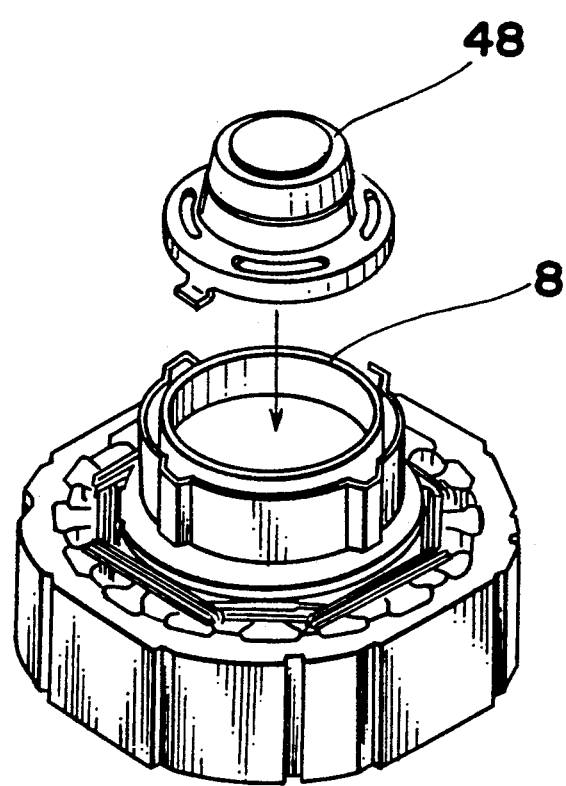
FIGS. 11 and 12 are schematic perspective views showing a process for assembling a rotor and other parts.
Figure 12:
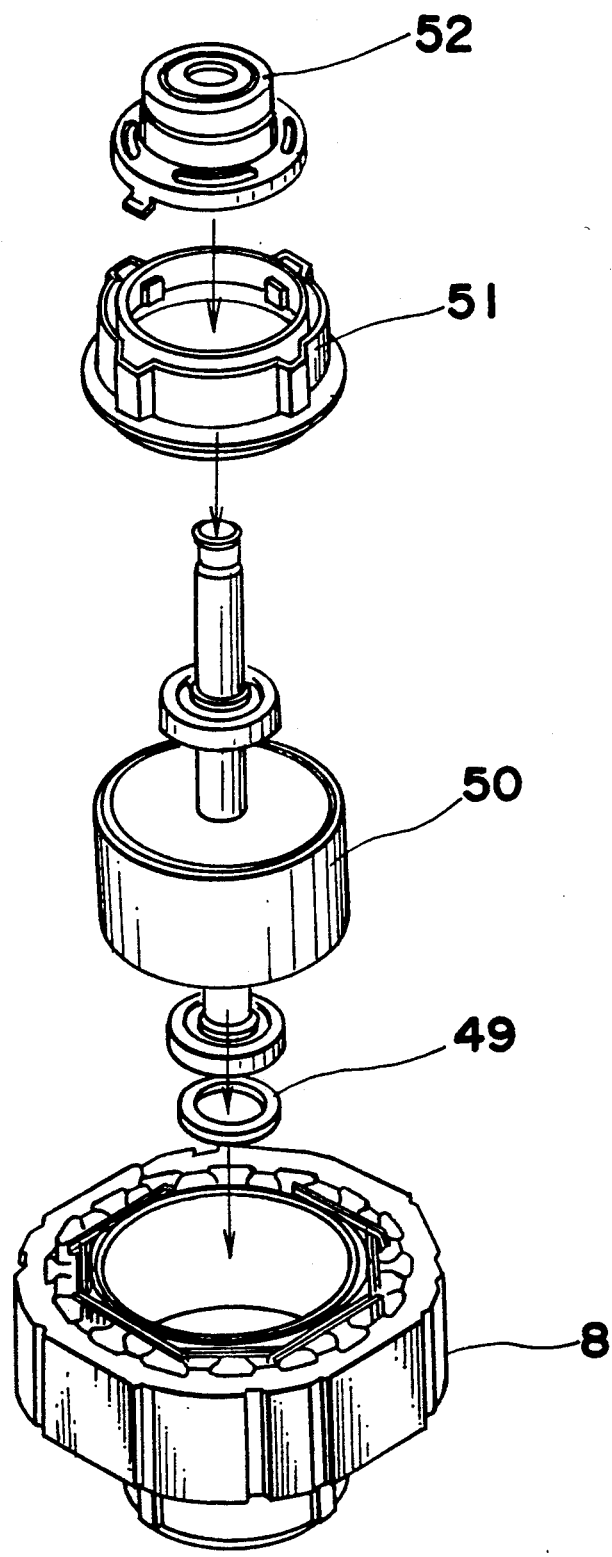

Reference numeral 47 denotes an assembling machine. The assembling machine 47 mounts a bracket 48 over of the opening portions of the core main body 8 as shown in FIG. 11. In mounting the bracket 48 over the opening, the core main body 8 is lifted from the pallet 45 so as to insert the bracket 48 into the core main body 8. Then, the bracket 48 is temporarily fixed to the core main body 8, and then the core main body 8 is inverted and returned to the pallet 45. As shown in FIG. 12, a washer 49, an assembled rotor 50, and an insulating ring 51 are inserted through the other opening of the core main body 8 and a bracket 52 is mounted thereon. Then, pressure resistance, and resistance value are inspected by an inspection device 53. Then, the brackets 48 and 52 are fixed to the core main body 8 by a molding machine 54 and a film is applied to the outer circumferential surfaces of the coils 19 and 29.

According to the method for manufacturing a stator for use in a rotating machine of the embodiment of the present invention, a clamp mechanism is provided on one end portion of a jig which carries a core so that the clamp mechanism holds the wind starting and terminating portions of a coil. When the wind starting and terminating portions of each coil are to be wound around a corresponding pin of a connector in a subsequent process, a chuck is capable of easily gripping each wind starting and terminating portion. Thus, the method of the embodiment of the present invention allows the start and terminating portions of each coil to be automatically clamped by the chuck. Therefore, the clamping of the start and terminating portions of each coil can be accomplished at a fast speed and without much time and labor. In addition, the method of the embodiment of the present invention automates the process for manufacturing a rotating machine including the process for incorporating a rotor into the stator of the rotating machine.

Further, the coil can be reliably held by inserting a wedge into an inserting portion after the coil is wound on the core, and further, the wedge can be fixed by a molding. Thus, the manufacturing process including an outer mounting can be automated on a conveyor line.

Although the present invention has been fully described in connection with the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A method for manufacturing a stator for use in a rotating machine provided with a core main body having a plurality of teeth projecting from an outer circumferential side of the core main body and wound with a coil, and a ring member fitted on the outer circumferential portion thereof, comprising the steps of:
    inserting a jig into the interior of the core main body;
    clamping a wind start portion of the coil on one portion of the jig, winding the coil between groups of teeth, and clamping a wind terminating portion of the coil on another portion of the jig;
    fitting the ring member over the outer circumferential portion of the core main body;
    mounting a terminal unit on the stator;
    releasing the wind start and wind terminating portions of the coil from the jig, and winding said portions around corresponding pins of said terminal unit and soldering said portions to said pins; and
    shaping the configuration of the portions of the coil positioned between the teeth.

2. The method as claimed in claim 1 further comprising, between the steps of inserting and clamping, the step of engaging the interior of the core main body by a mechinsm of the jig for holding the core main body on the jig.

3. The method as claimed in claim 1 wherein, during the winding step, as the coil is wound between the teeth, pressing the coil toward the center of the core main body in synchronization with the winding of the turns of the coil.

4. The method as claimed in claim 1 wherein said teeth have circumferentially extending projections thereon at the ends thereof, and said method further comprises pressing each coil toward the center of the core main body so as to shape the coil and urging each of said coils into the corresponding slit sufficiently far by such pressing to form a wedge receiving gap between the outer circumferential portion of each coil and the corresponding projections, and inserting a wedge of an insulating material into each gap so as to fill the gap.

5. The method as claimed in claim 1 wherein the step of mounting said terminal unit comprises mounting the unit on one of the core main body and the ring member, and said method further comprising, between the releasing of the wind start and terminating portions and winding said portions on said pins, the step of cutting said wind start and terminating portions to a predetermined length before winding them around the corresponding pins.

* * * * *